United States Patent
Xing et al.

(10) Patent No.: US 12,247,848 B2
(45) Date of Patent: Mar. 11, 2025

(54) AUTONOMOUS MOBILE DEVICE

(71) Applicant: Qfeeltech (Beijing) Co., Ltd., Beijing (CN)

(72) Inventors: Xingguo Xing, Beijing (CN); Xin Wu, Beijing (CN)

(73) Assignee: QFEELTECH (BEIJING) CO., LTD., Beijing (CN)

( * ) Notice: Subject to any disclaimer, the term of this patent is extended or adjusted under 35 U.S.C. 154(b) by 154 days.

(21) Appl. No.: 18/335,110

(22) Filed: Jun. 14, 2023

(65) Prior Publication Data

US 2023/0332934 A1 Oct. 19, 2023

Related U.S. Application Data

(63) Continuation of application No. PCT/CN2021/129468, filed on Nov. 9, 2021.

(30) Foreign Application Priority Data

Dec. 15, 2020 (CN) .......................... 202011482009.2

(51) Int. Cl.
*G05D 1/24* (2024.01)
*G01D 11/24* (2006.01)
*G05D 1/00* (2006.01)

(52) U.S. Cl.
CPC ........... *G01D 11/245* (2013.01); *G05D 1/024* (2013.01)

(58) Field of Classification Search
CPC ..................... G01D 11/245; G05D 1/024
See application file for complete search history.

(56) References Cited

U.S. PATENT DOCUMENTS

| 11,096,325 B2 * | 8/2021 | Song ................ A01D 34/81 |
| 2023/0324515 A1 * | 10/2023 | Xing ................. G05D 1/241 |
| | | 701/49 |

FOREIGN PATENT DOCUMENTS

| CN | 207082015 U | 3/2018 | |
| CN | 108594806 A * | 9/2018 | .......... G05D 1/0238 |
| CN | 208781068 U * | 4/2019 | |
| CN | 109717798 A | 5/2019 | |

(Continued)

OTHER PUBLICATIONS

International Search Report and Written Opinion dated Feb. 15, 2022, issued in PCT/CN2021/129468, filed on Nov. 9, 2021, and their English machine translations (16 pages).

*Primary Examiner* — Jamel E Williams
(74) *Attorney, Agent, or Firm* — MILLBURN IP PLLC

(57) ABSTRACT

An autonomous mobile device includes a main body, a protruding element disposed at a top portion of the main body, and a protection cover disposed at an outer side of the protruding element to cover the protruding element. The protection cover is movable relative to the protruding element when collided. The autonomous mobile device also includes a joystick sensor including a housing, a joystick, and a parameter detecting device. The autonomous mobile device further includes a position restoring device connected with the protection cover and configured to restore, after the protection cover experiences a displacement caused by an external force, the protection cover to a position where the protection cover is free from the external force. A first end of the joystick is connected to an inner portion of the housing. A second end of the joystick is connected to the protection cover.

8 Claims, 11 Drawing Sheets

(56) References Cited

FOREIGN PATENT DOCUMENTS

| | | | | |
|---|---|---|---|---|
| CN | 111571641 | A * | 8/2020 | ............. B25J 11/00 |
| CN | 112596524 | A | 4/2021 | |
| CN | 213634207 | U | 7/2021 | |
| CN | 107336267 | B * | 11/2023 | ............ B25J 13/084 |
| FR | 2857844 | A1 * | 1/2005 | ............. A47L 9/009 |
| KR | 20130020062 | A | 2/2013 | |
| TW | 583362 | U * | 9/2019 | |

\* cited by examiner

AUTONOMOUS MOBILE DEVICE

CROSS-REFERENCE TO RELATED APPLICATIONS

This application is a continuation of International Application No. PCT/CN2021/129468, filed on Nov. 9, 2021, which claims priority to Chinese Patent Application No. 202011482009.2, filed on Dec. 15, 2020, in Chinese Patent Office, and titled "Autonomous Mobile Device." The entire content of the above-mentioned applications is incorporated herein by reference.

TECHNICAL FIELD

The present disclosure generally relates to the technical field of smart home and, more specifically, to an autonomous mobile device.

BACKGROUND

As technologies advance and life quality increases, autonomous mobile devices equipped with different functions (e.g., floor sweeping robots, mover robots, etc.) have been gradually implemented in industrial productions and people's daily life.

An autonomous mobile device includes a main body and a motion device. The motion device is disposed at a bottom of the main body, and is in contact with the floor to cause the main body to move on the floor of a work zone in a desirable direction.

In some autonomous mobile devices, usually, a protruding element is disposed at a top portion of the main body, and is higher than the main body. Some measuring devices may be mounted in the protruding element to provide more functions. For example, the protruding element may be mounted with a Light Detection and Ranging (Lidar) device, a camera, or other sensors. The Lidar device is a type of distance measuring sensor configured to detect a distance between the Lidar device and surrounding objects in the environment in a horizontal direction. The distance information output by the Lidar device can be provided to the autonomous mobile device for the localization, mapping, and navigation of the autonomous mobile device. In order to enable the Lidar device to scan the surrounding environment at 360°, typically, the Lidar device is disposed in the protruding element at the top of the main body. Many autonomous mobile devices are equipped with cameras configured for Visual Simultaneous Localization and Mapping (VSLAM) or for object recognition. Some cameras may also be disposed in the protruding element at the top portion of the main body. Other sensors may also be installed on the autonomous mobile device, such as passive infrared sensors, ultrasonic distance measuring sensors, etc., in order to satisfy increasing demands from people for the autonomous mobile devices.

However, during movement of the autonomous mobile device, the protruding element disposed at the top portion of the main body of the autonomous mobile device may easily collide with obstacles in the environment, which may cause important sensors disposed in the protruding element, such as the Lidar device, to be impaired or damaged.

SUMMARY OF THE DISCLOSURE

The present disclosure provides an autonomous mobile device configured to solve the issue relating to the Lidar device being disposed at the top of the main body, and the Lidar device being easy to collide with the obstacles in the environment during movement, causing impairment or damages to the Lidar device.

The autonomous mobile device provided by embodiments of the present disclosure includes a main body, a protruding element, a protection cover, a joystick sensor, and a processor. The protruding element is disposed at a top portion of the main body. The protection cover is disposed at an outer side of the protruding element to cover the protruding element, and can move relative to the protruding element when the protection cover experiences a collision. The joystick sensor may include a housing, a joystick, and a parameter detecting device. A first end of the joystick is connected to an inner portion of the housing. The joystick is configured to pivot around a connection point between the joystick and the inner portion of the housing. A second end of the joystick is connected to the protection cover, such that the protection cover can cause the joystick to pivot. The parameter detecting device is disposed inside the housing, and is configured to detect a pivot parameter of the joystick.

In some embodiments, the pivot parameter includes one or more of a pivot angle, a pivot velocity, or a pivot acceleration.

In some embodiments, the joystick is configured to be movable along an axial direction of itself (or longitudinal direction of itself), and the parameter detecting device is also configured to detect a travel distance of the axial direction movement.

In some embodiments, the autonomous mobile device also includes a position restoring device. The position restoring device is connected with the protection cover, and is configured to, after the protection cover experiences a displacement caused by an external force, restore the protection cover to a position where the protection cover is free from the external force.

In some embodiments, a position restricting pillar may be disposed at an upper portion of the main body. The protection cover may include a cover body disposed at an outer periphery of the protruding element to cover the protruding element, and a protruding flange disposed at a lower portion of the cover body. An elongated cavity extending in a positive moving direction of the autonomous mobile device is disposed on the protruding flange. The position restricting pillar is inserted into the elongated cavity. The position restoring device is connected with the position restricting pillar and a wall of the elongated cavity, respectively.

In some embodiments, the joystick sensor is disposed between the protection cover and the main body.

In some embodiments, when the protection cover is at an initial position, the second end of the joystick extends straightly upwardly and is connected with the protection cover.

In some embodiments, a mounting groove is disposed at the upper portion of the main body. The joystick sensor is embedded in (or inserted into) the mounting groove, and the protection cover covers an opening of the mounting groove.

In some embodiments, a connecting groove is provided on the protection cover. The second end of the joystick is inserted into the connecting groove, and the second end includes a surface of a partial sphere. The surface of the partial sphere abuts against an inner wall of the connecting groove.

In some embodiments, the autonomous mobile device may also include an elevation device. The main body may include a frame and a fixing part. An elevation channel is disposed within the frame. The fixing part is slidably disposed inside the elevation channel. The protruding element and the protection cover are both disposed on the fixing part. The elevation device is connected with the frame and the fixing part. When the parameter detecting device detects a collision occurring to the protection cover, the elevation device is configured to drive the fixing part to retract into the elevation channel, such that the protection cover and the protruding element retract into the elevation channel.

The autonomous mobile device provided by the embodiments of the present disclosure includes a joystick sensor. A first end of the joystick is connected to an inner portion of the housing, and the joystick can pivot around a connection point between the joystick and the housing. A second end of the joystick is connected to the protection cover. When the protection cover experiences a collision, the protection cover causes the joystick to pivot. The parameter detecting device determines whether the protection cover has experienced a displacement, i.e., whether the autonomous mobile device has experienced a collision by an external force, through detecting a pivot parameter of the joystick. As such, the autonomous mobile device can take the next action based on the detection result, making the autonomous mobile device more intelligent.

BRIEF DESCRIPTION OF THE DRAWINGS

In order to more clearly describe the technical solutions of the present disclosure or the existing technology, the drawings referred to in the descriptions of the embodiments or the existing technology are briefly introduced below. It is understood that the drawings described below are some embodiments of the present disclosure. A person having ordinary skills in the art can obtain other drawings based on these drawings without spending creative effort.

LABELS FOR ACCOMPANYING DRAWINGS

Figure 1:
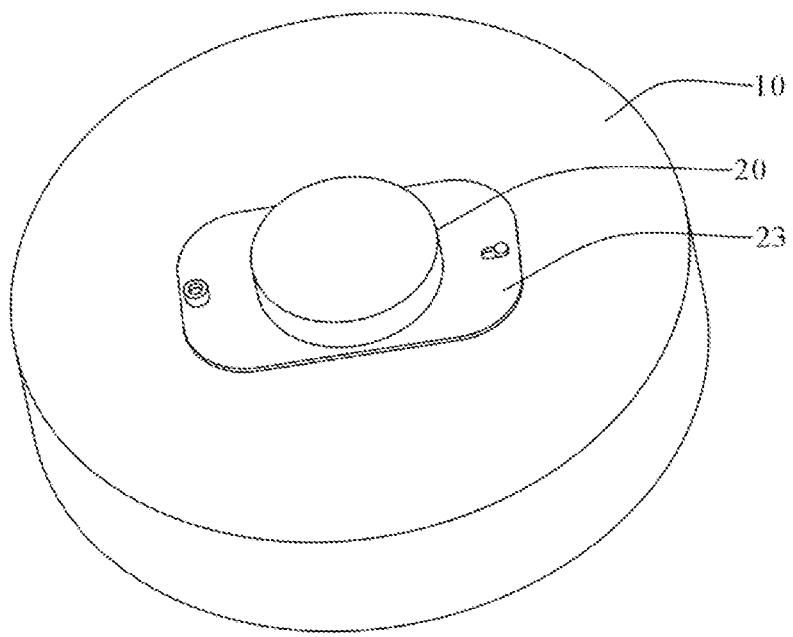
FIG. 1 is a schematic illustration of an autonomous mobile device according to an embodiment of the present disclosure.

5—autonomous mobile device; 10—main body; 11—mounting groove; 12—position restricting pillar; 19—processor; 20—protection cover; 21—connecting groove; 22—elongated cavity; 22a—inner wall of the elongated cavity; 23—protruding flange; 30—protruding element; 33—position restoring device; 40—joystick sensor; 41—joystick; 42—housing; 44—parameter detecting device; 47—arrow; 48—arrow; 70—elevation device; 71—driving nut; 72—driving screw; 73—rotation device; 74—driving pinion; 75—rack; 80—detecting apparatus; 92—fixing part; 95—elevation channel; 98—frame; 111—positive moving direction; 411—direction opposite to the positive moving direction.

DETAILED DESCRIPTION

In order to clearly present the objective, technical solution, and advantage of the present disclosure, next, the technical solutions of the present disclosure will be clearly and comprehensively described with reference to the drawings. It is understood that the described embodiments are merely some embodiments of the present disclosure, and are not all of the embodiments. Based on the described embodiments of the present disclosure, a person having ordinary skills in the art can derive other embodiments without spending creative effort. Such derived embodiments also fall within the scope of the present disclosure. When there is no conflict, the embodiments and the features of the embodiments described below can be combined.

In the embodiments of the present disclosure, unless otherwise noted, terms such as "mount," "connect," "couple," "fix," should be interpreted broadly. For example, such a term can encompass fixed connection, removable/detachable connection, integrated connection, mechanical connection, electrical connection or communicative connection. The connection can be direct connection, or indirect connection through an intermediate medium. Such a term can describe internal connections between two elements or mutual interaction relationship between the two elements, unless otherwise noted. A person having ordinary skills in the art can understand the specific meaning of such a term in this disclosure based on specific context and descriptions.

The term "processor" or "processing device" used herein may encompass any suitable processor, such as a central processing unit ("CPU"), a graphics processing unit ("GPU"), an application-specific integrated circuit ("ASIC"), a programmable logic device ("PLD"), or a combination thereof. Other processors not listed above may also be used. A processor may be implemented as software, hardware, firmware, or a combination thereof.

The term "non-transitory computer-readable medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("RAM"), a flash memory, etc.

A hollow-lower-portion type obstacle is an obstacle, a lower portion of which forms a space with a floor. The space or channel can allow an object of a specific height to enter. For example, the hollow-lower-portion type obstacle may be furniture or home appliances such as a bed, a table, a cabinet, a sofa, which has relatively long legs and which has a lower portion forming a space with the floor.

Some autonomous mobile devices are equipped with a Lidar device. The Lidar device may scan the surrounding environment to measure distances from the Lidar device to obstacles in the environment, thereby providing distance/location information for mapping and localization. The Lidar device is typically disposed inside the protruding element located at the top portion of the main body, such that the best scanning and distance measuring effect may be achieved.

Because the protruding element in which the Lidar device is located is higher than the main body of the autonomous mobile device, when the autonomous mobile device enters the space under the hollow-lower-portion type obstacle, in some conditions, the main body of the autonomous mobile device may pass through the space (therefore the collision sensor mounted at the front portion of the main body of the autonomous mobile device is not triggered), but the protruding element on the top portion of the main body is collided. As a result, the Lidar device may be collided by the hollow-lower-portion type obstacle, which may cause damage to the Lidar device or may cause the autonomous mobile device to be jammed.

Therefore, embodiments of the present disclosure provide an autonomous mobile device, in which, a protection cover is disposed at an outer side of the Lidar device to cover the Lidar device. When the protection cover is collided, the force exerted on the protection cover or the displacement caused by the collision is detected by the joystick sensor, such that the autonomous mobile device can sense the collision. After the autonomous mobile device senses the collision, the autonomous mobile device may stop moving forward, take predicament escape measures, and/or sound an alarm, etc. The technical solution disclosed herein may reduce the chance of damaging the Lidar device, and avoid jamming the autonomous mobile device.

Next, the autonomous mobile device provided by the embodiments of the present disclosure is explained in detail with reference to the accompanying drawings.

As shown in FIG. 1 to FIG. 6, embodiments of the present disclosure provide an autonomous mobile device 5. The autonomous mobile device 5 is a smart mobile device configured to autonomously execute predetermined tasks within a designated zone. In the embodiments of the present disclosure, the autonomous mobile device 5 includes, but is not limited to, a cleaning robot (such as a smart floor sweeping robot, a smart floor mopping robot, a window cleaning robot), a companion mobile robot (e.g., a smart electronic pet, a nanny robot), a service type mobile robot (e.g., a reception robot in a restaurant, hotel, or meeting place), an industrial inspection smart device (e.g., a power line inspection robot, a smart forklift, etc.), a security robot (e.g., home or commercial smart security robot), etc.

In the embodiments, the autonomous mobile device 5 may include a main body 10, a protruding element 30, a protection cover 20, a joystick sensor 40, and a processor 19 (shown in FIG. 2 only) connected with the joystick sensor 40. The autonomous mobile device 5 may include a motion device configured to move the main body 10 on the floor. The main body 10 moves when driven by the motion device. Illustratively, the main body 10 may have an overall cylindrical shape. The motion device may be mounted to the lower portion of the main body 10. The motion device may include an omni-direction wheel mounted to the front bottom of the main body 10 in a positive moving direction 111 (shown in FIGS. 2-4), and driving wheels symmetrically disposed at two sides of a central axis of the bottom of the main body 10 of the autonomous mobile device 5.

It is understood that the present disclosure does not limit the configuration of the motion device disposed on the main body 10, or the disposition location of the motion device. The motion device may include track type motion mechanisms that are arranged in parallel, or dual-legged/multi-legged walking mechanisms.

The protruding element 30 may be disposed at a top portion of the main body 10 and may protrude from the top portion. The protruding element 30 may be detachably mounted to the main body 10. For example, in order to implement certain function, the Lidar device, camera, and sensors that are disposed on the top portion of the main body 10 and that protrude from the top portion may form the protruding element 30. The protruding element 30 may be integrally connected with the main body 10 to form a single structure. For example, in order to accommodate mechanical or electrical elements disposed inside the main body 10, an accommodation structure may be disposed at the top portion of the main body 10. In this embodiment, the protruding element 30 may be formed by the Lidar device disposed at the top portion of the main body 10, or may also include parts for housing or fixing the Lidar device. During an operation of the autonomous mobile device, the Lidar device may scan the surrounding environment to provide distance/location information of obstacles in the environment for localization and mapping for the autonomous mobile device 5, thereby providing data support for reasonable and efficient route planning or navigation.

The protection cover 20 may be disposed at an outer side of the protruding element 30 to cover the protruding element 30. The protection cover 20 may be movable relative to the protruding element 30 when the protection cover 20 is collided by an obstacle in the environment. For example, the protection cover 20 may be movably connected with the main body 10. The term "movably connected" or "movable connection" in the present disclosure means that two objects movably connected together may restrict one another, may at least roughly define the relative locations of the two objects, and may experience relative movement or rotation to a certain extent. When the protection cover 20 is not experiencing a collision, the protection cover 20 is at an initial location. When the protection cover 20 is collided by an external force, the protection cover 20 experiences a displacement to move away from the initial location. The joystick sensor 40 may determine whether the protection cover 20 is collided by an obstacle in the environment through detecting the displacement of the protection cover 20, thereby sensing the external force at an early time to protect the protruding element 30 from damages caused by the external force.

In some embodiments, a gap may exist between the protection cover 20 and the protruding element 30. As such, when the protection cover 20 moves due to the collision, contact between the protection cover 20 and the protruding element 30 may be avoided, and damage to the components in the protruding element 30 may be avoided. Illustratively, using the configuration in which the Lidar device is disposed inside the protruding element 30 as an example, the protection cover 20 may include a top plate disposed above the Lidar device and multiple supporting pillars connected to the lower side of the top plate. Two adjacent supporting pillars may be spaced apart with an empty space formed therebetween, which reduces blockage of the protection cover 20 to the emitted light and received light of the Lidar device. The present disclosure does not limit the material and the structure of the protection cover 20.

Various types of connections may be used to movably connect the protection cover 20 and the main body 10. For example, the main body 10 may be provided with a sliding groove extending in the positive moving direction of the autonomous mobile device. The protection cover 20 may be slidably mounted on the sliding groove. When the protection cover 20 experiences a collision, the protection cover 20 may slide along the sliding groove.

Figure 3:
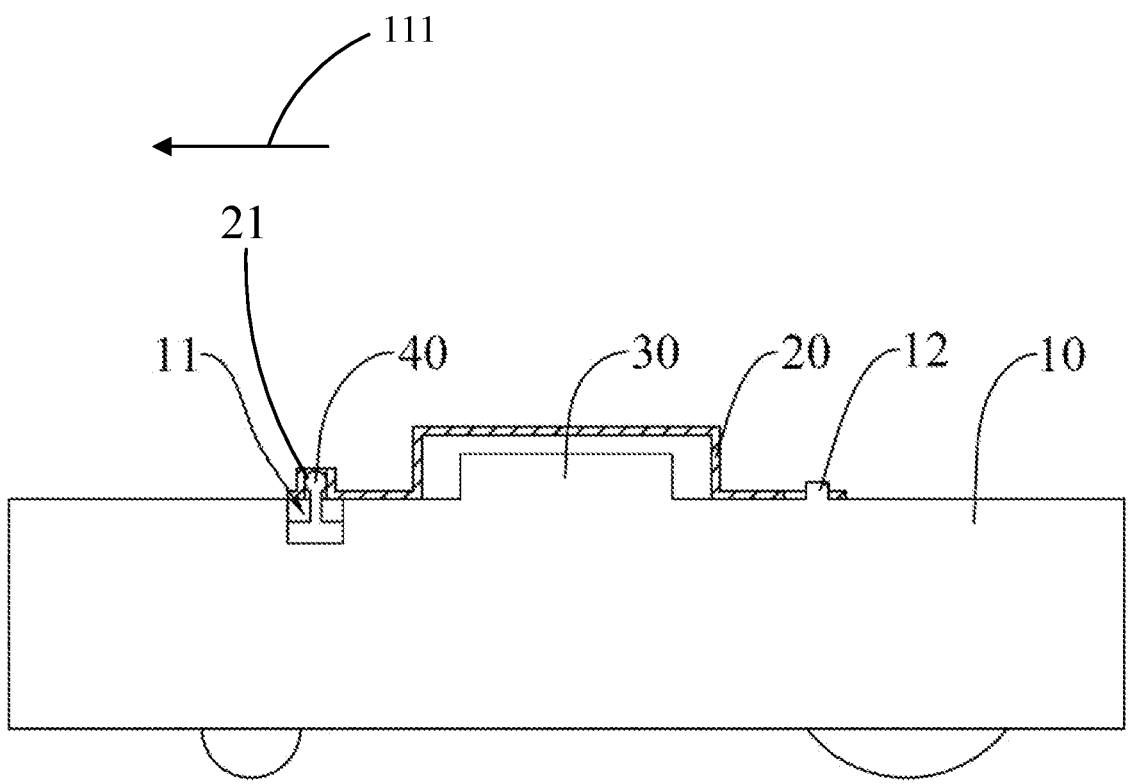
FIG. 3 is a sectional view of the autonomous mobile device when the autonomous mobile device is not under a collision, according to an embodiment of the present disclosure.
Figure 6:
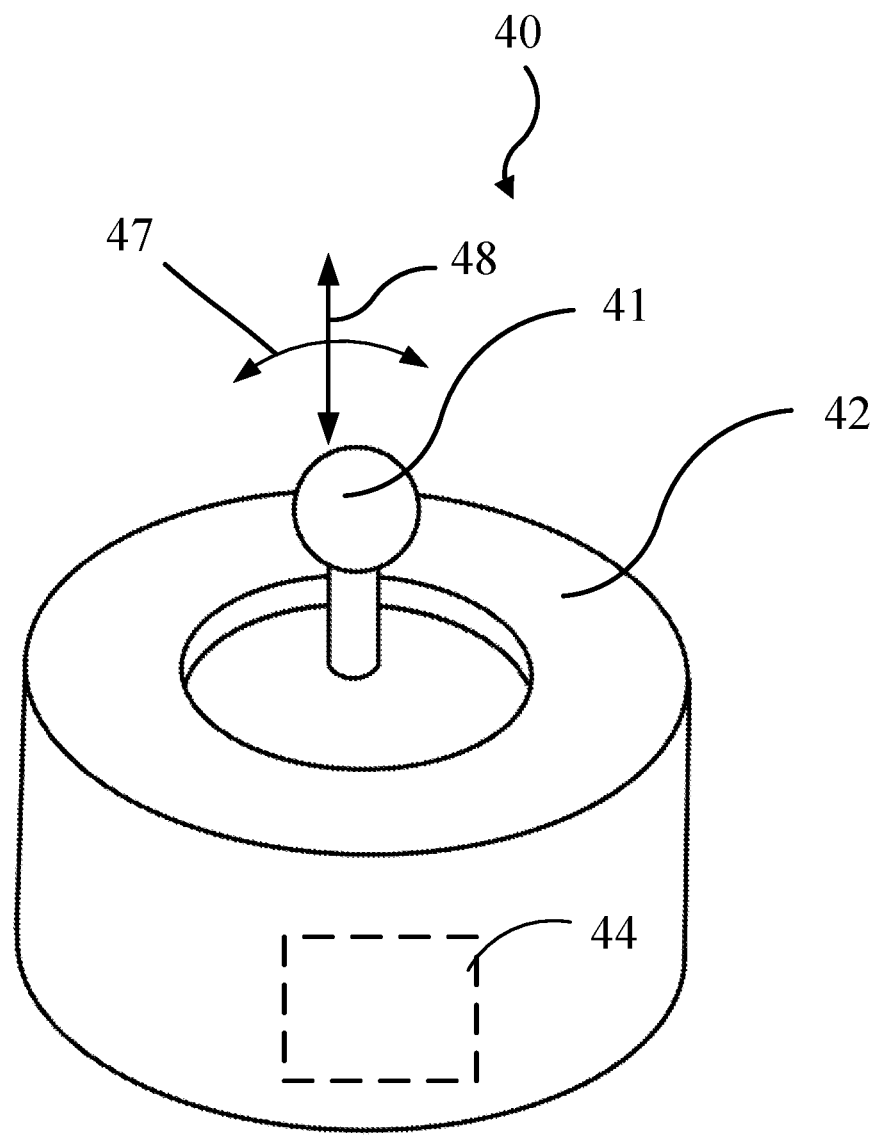
FIG. 6 is a schematic illustration of a joystick sensor of the autonomous mobile device, according to an embodiment of the present disclosure.

The embodiments of the present disclosure provide a joystick sensor. In this embodiment, as shown in FIG. 6, the joystick sensor 40 may include a housing 42, a joystick 41, and a parameter detecting device 44. As shown in FIG. 3, the joystick sensor 40 may be provided on the main body 10. As shown in FIG. 6, A first end (or lower end) of the joystick 41 may be connected to an inner portion of the housing 42, and the joystick 41 may pivot around a connection point between the joystick 41 and the housing 42. An example direction of pivoting is indicated by an arrow 47 shown in FIG. 6. The pivoting may be in any other directions. A second end (or upper end) of the joystick 41 may be connected to the protection cover 20, as shown in FIG. 3, such that the protection cover 20 may cause the joystick 41 to pivot. The parameter detecting device 44 may be disposed in the housing 42, and may be configured to detect a pivot parameter of the joystick 41. Illustratively, the parameter detecting device 44 may include a slidable rheostat (or a variable resistor). The first end of the joystick 41 may be connected with the slidable rheostat. The pivot of the joystick 41 may change the resistance of the slidable rheostat. The resistance may be used to determine the pivot parameter of the joystick 41. Additionally or alternatively, the parameter detecting device 44 may also include a variable capacitor. The pivot of the joystick 41 may change the capacitance of the variable capacitor. The capacitance may be used to determine the pivot parameter of the joystick 41. Additionally or alternatively, the parameter detecting device 44 may also be an inductor or a gyroscope.

In some embodiments, the pivot parameter may include one or more of a pivot angle, a pivot velocity, or a pivot acceleration. For example, in the implementation in which the parameter detecting device 44 includes a slidable rheostat, the pivot angle may be determined based on the value of the resistance. The pivot velocity may be determined based on the changing rate of the resistance, and the pivot acceleration may be determined based on a derivative of the changing rate of the resistance. The pivot angle may reflect the displacement of the protection cover 20 after the protection cover 20 is collided. The pivot velocity may reflect the relative velocity or momentum between the protection cover 20 and the obstacle when the protection cover 20 is collided. The pivot acceleration may reflect the collision force exerted on the protection cover 20 during a collision. In practice, depending on applications, the pivot angle, pivot velocity, and pivot acceleration may be flexibly selected.

The autonomous mobile device provided by the embodiments of the present disclosure includes the joystick sensor 40. The first end (or lower end) of the joystick 41 may be connected to an inner portion of the housing 42. The joystick 41 may pivot around a connection point between the joystick 41 and the inner portion of the housing 42. The second end (or upper end) of the joystick 41 may be connected to the protection cover 20, as shown in FIG. 3. When the protection cover 20 experiences a displacement caused by a collision, the protection cover 20 may cause the joystick 41 to pivot around the connection point. The parameter detecting device 44 may determine whether the protection cover 20 experiences a displacement, i.e., whether the autonomous mobile device is collided by an external force, through detecting the pivot parameter of the joystick 41. As such, the autonomous mobile device may take the next action based on the determination result, such that the autonomous mobile device may be more intelligent in avoiding damages.

In some embodiments, the joystick 41 may move along an axial direction (or longitudinal direction) of itself. The axial direction is shown as an arrow 48 in FIG. 6. For example, when the joystick 41 is pressed downwardly, the joystick 41 may move downwardly toward the inside of the housing 42 shown in FIG. 6. The parameter detecting device 44 may be configured to detect a travel distance of the axial movement of the joystick 41. As such, the number of types of motion detectable by the joystick sensor 40 is increased. Illustratively, the joystick sensor 40 may also include a micro-motion switch. The micro-motion switch may be disposed inside the housing 42, and may face the first end of the joystick 41. When the joystick 41 moves in the axial direction of itself, for example, as shown in the embodiment shown in FIG. 3, when a downward pressing force is exerted on the joystick 41, the first end (or lower end) of the joystick 41 may press the micro-motion switch, thereby triggering the micro-motion switch so that the autonomous mobile device senses the pressing force. Other methods may also be used to detect the axial direction movement of the joystick 41. For example, the first end (or lower end) of the joystick 41 may have magnetism. An induction coil may be disposed inside the housing 42. The relative movement between the joystick 41 and the induction coil generates an inductive current in the induction coil. The axial direction movement of the joystick 41 may be detected by detecting the inductive current. It is understood, that the pressing force may be a pressing force directly exerted on the joystick 41. In some embodiments, an external force may be exerted on the protection cover 20, and the pressing force is transmitted by the protection cover 20 to the joystick 41.

Figure 11A:
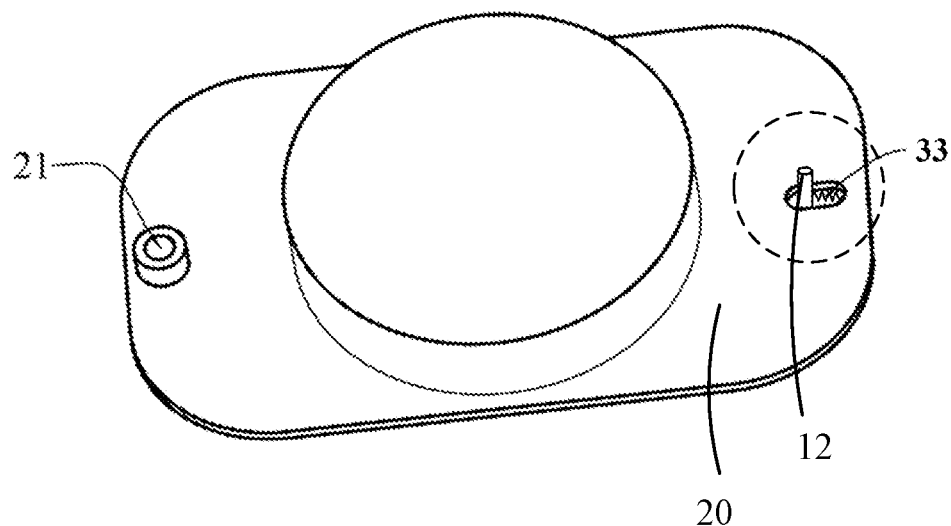
FIG. 11A is a schematic illustration of a position restoring device connected with a position restricting pillar and an inner wall of an elongated cavity, according to an embodiment of the present disclosure.
Figure 11B:
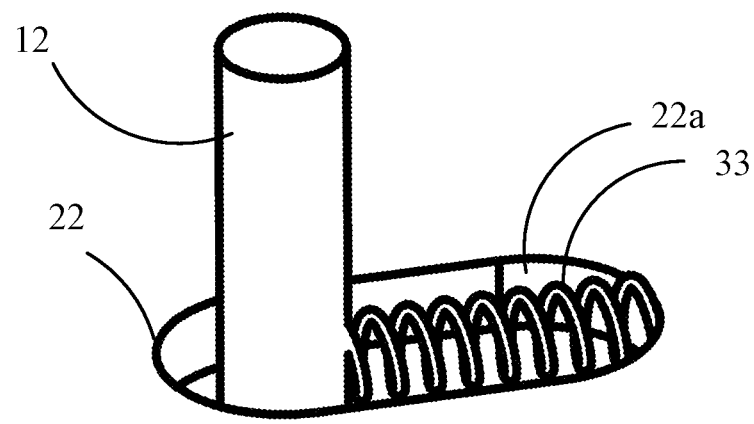
FIG. 11B is an enlarged view of a circled portion shown in FIG. 11A, showing the connection between the inner wall and the position restricting pillar through the position restoring device.

In some embodiments, the autonomous mobile device may also include a position restoring device 33 (shown in FIG. 11A and FIG. 11B). The position restoring device 33 may be connected with the protection cover 20. After the protection cover 20 experiences a displacement caused by an external force, the position restoring device 33 may be configured to restore the protection cover 20 to a position where the protection cover 20 is free from the external force. After the protection cover 20 is restored to the position where the protection cover 20 is free from the external force, the protection cover 20 and the joystick sensor 40 may perform the next detection. The position restoring device 33 may include elements such as a spring, an elastic plate, a rubber buffering cushion, etc. The protection cover 20 may move to cause the position restoring device 33 to deform elastically, such that a restoring force is generated in the position restoring device 33 to drive the protection cover 20 to restore the position of the protection cover 20. Although a spring is shown in FIG. 11A and FIG. 11B as an example of the position restoring device 33, in some embodiments, the position restoring device 33 may include two magnetic elements having the same pole. The expelling force between the two magnetic elements may provide the restoring force to drive the protection cover 20 to restore the position of the protection cover 20.

Figure 4:
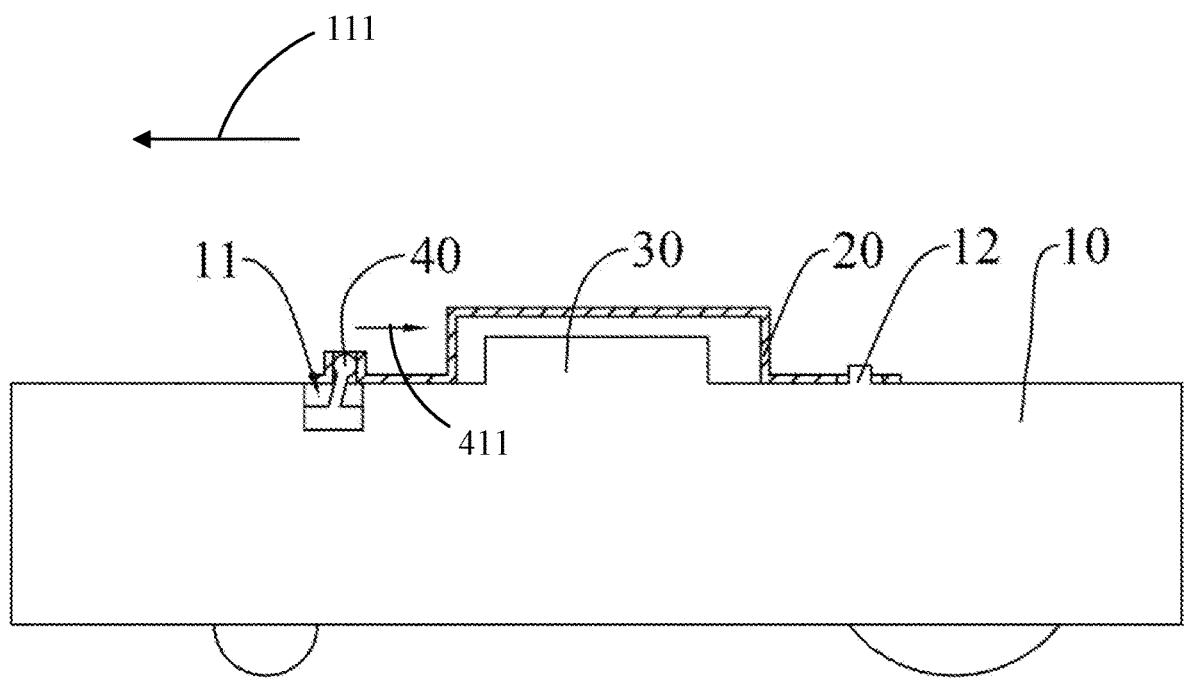
FIG. 4 is a sectional view of the autonomous mobile device when the autonomous mobile device is under a collision, according to an embodiment of the present disclosure.
Figure 5:
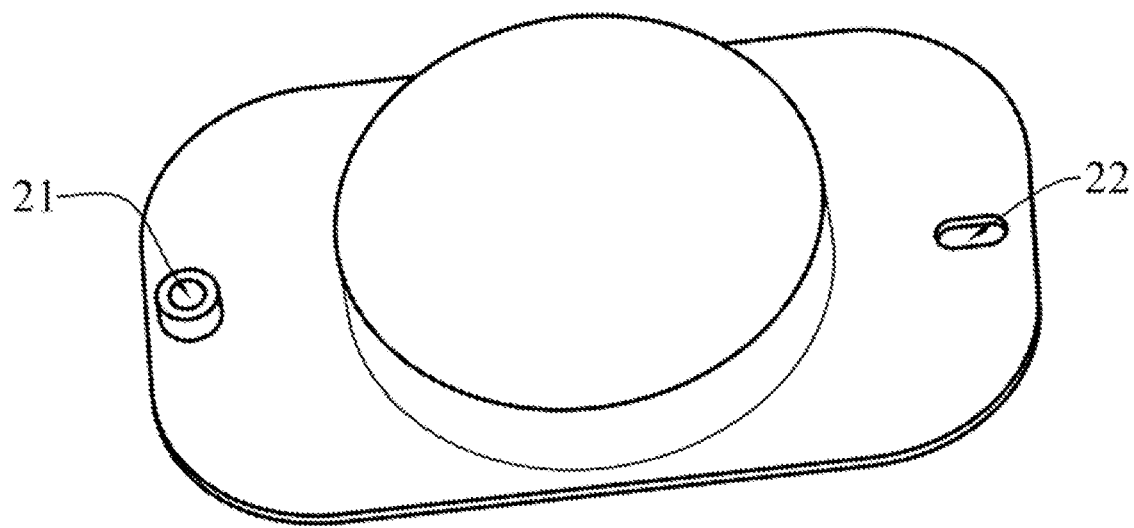
FIG. 5 is a schematic illustration of a protection cover of the autonomous mobile device, according to an embodiment of the present disclosure.

In some embodiments, the position restoring device 33 may be connected with the protection cover 20 and the main body 10. Various connection methods may be used to connect the position restoring device 33 with the protection cover 20 and the main body 10. In some embodiments, the protection cover 20 may include a cover body disposed at an outer periphery of the protruding element 30 to cover the protruding element, and a protruding flange 23 disposed at a lower portion of the cover body. An elongated cavity 22 extending in a positive moving direction of the autonomous mobile device is disposed on the protruding flange 23, as shown in FIG. 5. An upper portion of the main body 10 is provided with a position restricting pillar 12, as shown in FIG. 3 and FIG. 4. The position restricting pillar 12 may penetrate through the elongated cavity 22, as shown in FIG. 3 and FIG. 4. FIG. 11A shows that the position restricting pillar 12 penetrating through the elongated cavity 22 is connected to an inner wall of the elongated cavity 22 through the position restoring device 33, and FIG. 11B is an enlarged view of the circled portion of FIG. 11A. In some embodiments, the position restoring device 33 may be connected with the position restricting pillar 12 and an inner wall 22a of the elongated cavity 22 (only a portion of the inner wall 22a of the elongated cavity 22 is shown in FIG. 11B). The position restricting pillar 12 and the elongated cavity 22 may work together to limit the moving range of the protection cover 20, in order to avoid collision of the protection cover 20 with the protruding element 30 due to the displacement of the protection cover 20 being too large, or to avoid the damage to the joystick sensor 40.

Figure 2:
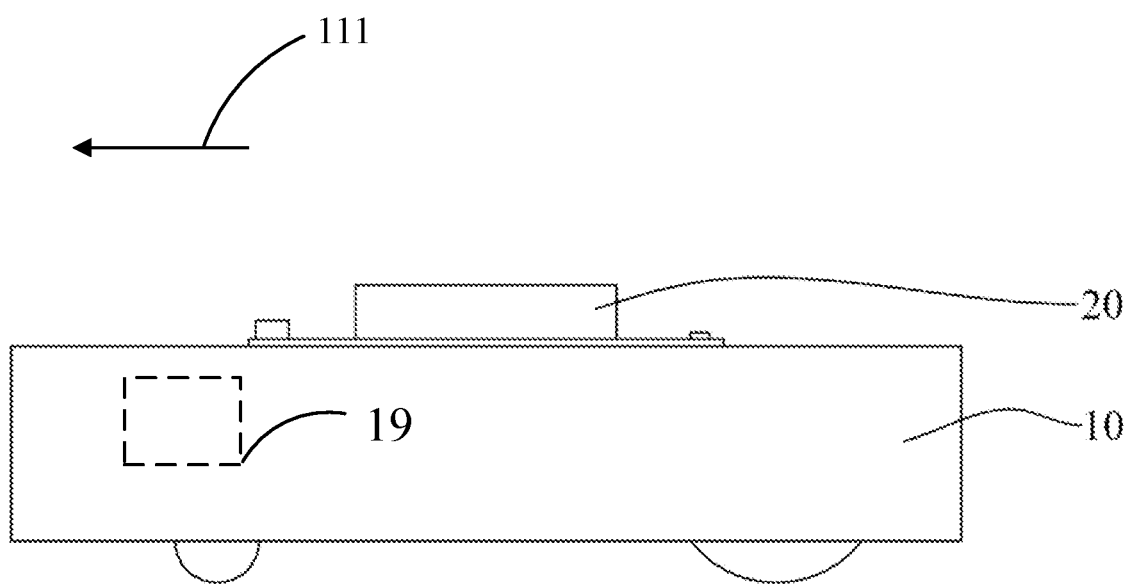
FIG. 2 is a side view of the autonomous mobile device according to an embodiment of the present disclosure.

Illustratively, as shown in FIG. 1 to FIG. 4, the protruding flange 23 may be connected with the lower portion of the cover body and may be parallel with an upper surface of the main body 10. The elongated cavity 22 may be provided on the protruding flange 23. In some embodiments, a length direction of the elongated cavity 22 may be parallel with the positive moving direction 111 of the autonomous mobile device 5. The position restricting pillar 12 may be perpendicularly connected with an upper portion of the main body 10 (i.e., the position restricting pillar 12 may protrude upwardly from the upper portion of the main body 10). As shown in FIG. 11A and FIG. 11B, in some embodiments, the position restoring device 33 may include a spring. A first end of the spring may be connected with the inner wall 22a of the elongated cavity 22. A second end of the spring may be connected with the position restricting pillar 12. The spring is only one example of the position restoring device 33, which may include any other suitable position restoring mechanisms. FIG. 2 is a sectional view of the protection cover 20 when the protection cover 20 is not under a collision. As shown in FIG. 4, when the protection cover 20 is subject to a component force in a direction opposite to the positive moving direction 411 (i.e., the component force in the direction shown by an arrow 411), the protection cover 20 may move in the direction shown by the arrow 411 while being restricted by the position restricting pillar 12, and may compress the spring to generate an elastic restoring force in the spring that may drive the protection cover 20 to restore its position. It is understood that for the shape of the elongated cavity 22, in addition to the oval or rectangular shape with rounded corners, as shown in FIG. 1, can be other suitable shapes, such as a circular sector shape.

In some embodiments, the elongated cavity 22 may be replaced by a second joystick sensor. That is, a second joystick sensor may be disposed at the location of the elongated cavity 22 to replace the elongated cavity 22. Because the joystick sensor itself has a certain degree of free movement in terms of displacement and angle, when the joystick of the joystick sensor 40 disposed at the front portion of the autonomous mobile device pivots, the protection cover 20 may transmit the movement caused by the pivot to the second joystick sensor disposed at the back portion of the autonomous mobile device, such that the second joystick sensor may also realize the same function as the elongated cavity 22. In some embodiments, the joystick sensor 40 may be disposed between the protection cover 20 and the main body 10. This configuration may protect the joystick sensor 40 from external collision, which may cause damage to the joystick sensor 40. Illustratively, the joystick sensor 40 may be disposed between the protruding flange 23 of the protection cover 20 and the main body 10, and there may be a sufficient gap between the protruding flange 23 and the main body 10, such that the protruding flange 23 may transmit an external pressing force to the joystick sensor 40. The joystick sensor 40 may also be disposed between the cover body of the protection cover 20 (i.e., the protruding portion in the middle of the protection cover 20) and the main body 10.

The present disclosure does not limit the position, quantity, and configuration of the joystick sensor. For example, illustratively, two joystick sensors may be disposed between the protruding flange 23 of the protection cover 20 and the main body 10. The two joystick sensors may be disposed at a front portion and a back portion of the main body 10, as described above, or may be disposed at a left portion and a right portion of the main body 10 symmetrically, or the configuration may be asymmetric. With the two joystick sensors, the elongated cavity 22 and the position restricting pillar 12 that match one another may be omitted, such that a space may be provided for the movement of the protection cover 20. In some embodiments, four joystick sensors may be disposed between the protruding flange 23 of the protection cover 20 and the main body 10. Each of the four joystick sensors may be disposed at one of a front, a back, a left, and a right portion on the protruding flange 23 of the protection cover 20. Alternatively, two joystick sensors may be disposed at the front portion of the cover body and two joystick sensors may be disposed at the back portion of the cover body. Alternatively, three joystick sensors may be disposed at the front portion of the cover body, and one joystick sensor may be disposed at the back portion of the cover body. Three or other number of joystick sensors may be disposed between the protruding flange 23 of the protection cover 20 and the main body 10, and these joystick sensors may be distributed in multiple manners, which are not described herein. In some embodiments, at an initial state, the protection cover 20 may be at an initial position. The second end of the joystick 41 may extend straightly upwardly and be connected with the protection cover 20. Thus, at the initial state, the gravity of the protection cover 20 exerted on the joystick 41 and the supporting force of the joystick 41 and the elastic force or magnetic force of the position restoring device 33 reach a balance. At this moment, the joystick 41 is at an equilibrium state, and will not pivot. Thus, the gravity of the protection cover 20 may not affect the joystick sensor 40 to detect a pressing force.

In some embodiments, a mounting groove 11 may be disposed on the upper portion of the main body 10. The joystick sensor 40 may be embedded in (or inserted into) the mounting groove 11, and a portion of the protection cover 20 may cover the opening of the mounting groove 11. The joystick sensor 40 may be embedded in (or inserted into) the mounting groove 11. On one hand, the structure of the main body 10 is simpler, which increases the aesthetic appearance. On the other hand, the chance of having an accidental scraping is reduced. Illustratively, the upper surface of the main body 10 may depress downwardly to form the mounting groove 11. After the joystick sensor 40 is embedded in (or inserted into) the mounting groove 11, the second end (or upper end) of the joystick 41 may extend out of the mounting groove 11 to connect with the protection cover 20 that covers the opening of the mounting groove 11. In some embodiments, the second end of the joystick 41 may not extend out of the mounting groove 11. Instead, a portion of the protection cover 20 may extend into the mounting groove 11 to connect with the joystick 41, such that the joystick sensor 40 does not extend out of the upper surface of the main body 10.

In some embodiments, the protection cover 20 is provided with a connecting groove 21, as shown in FIG. 1 and FIG. 3. The second end of the joystick 41 may be embedded in (or inserted into) the connecting groove 21, and the second end may include a surface of a partial sphere. The surface of the partial sphere may abut against an inner wall of the connecting groove 21. The inner wall of the connecting groove 21 that contacts the second end of the joystick 41 may be an inner concave sphere surface that matches with the surface of the partial sphere of the second end of the joystick 41. As such, not only the joint movement of the joystick 41 and the protection cover 20 is ensured, the degree of freedom of the connection between the joystick 41 and the protection cover 20 is increased. The situation of jamming the joystick 41 due to manufacturing error or assembly error can be avoided. Illustratively, as shown in FIG. 5, a through hole may be provided on the protruding flange 23. A connecting tube connected with the through hole may be disposed at and protrude from a side of the protruding flange 23 facing the cover body. The connecting tube and the through hole together form the connecting groove 21. In some embodiments, if the thickness of the wall of the protruding flange 23 allows, the connecting groove 21 may be directly provided at a side of the protruding flange 23 facing against the cover body. The connecting groove 21 may be configured to accommodate and protect the joystick sensor. Thus, the disposition of the connecting groove 21 may be based on the quantity and configuration of the joystick sensor, which is not described herein. In some embodiments, as shown in FIG. 7 to FIG. 10, the autonomous mobile device may also include an elevation device 70. The main body 10 may include a frame 98 and a fixing part 92. An elevation channel 95 may be provided within the frame 98. The fixing part 92 may be slidably disposed inside the elevation channel 95. The protruding element 30 and the protection cover 20 may both be disposed on the fixing part 92. The elevation device 70 may be connected with the frame 98 and the fixing part 92. When the joystick sensor 40 detects that the protection cover 20 is experiencing a collision, the elevation device may be configured to drive the fixing part 92 to retract into the elevation channel 95, such that the protection cover 20 and the protruding element 30 retract into the elevation channel 95. Further, the autonomous mobile device may include a detecting apparatus 80 configured to detect a position of the fixing part 92 in the elevation channel 95.

Because the protruding element 30 and the protection cover 20 can extend out and retrack into the elevation channel 95, when the protection cover 20 is collided (e.g., when the protection cover 20 is jammed by a hollow-lower-portion obstacle), the protruding element 30 and the protection cover 20 may descend and retract into the elevation channel 95, such that the autonomous mobile device may escape the predicament.

It is understood that the height of the protruding element 30 protruding out of the upper surface of the main body 10 may be smaller than or equal to ½ of the height of the main body 10, which may avoid the situation of the protruding element 30 falling out of the elevation channel 95.

It is understood that during the process of a normal operation of the autonomous mobile device, the protection cover 20 and the protruding element 30 are maintained at the upper limit positions, i.e., the highest positions. When the protection cover 20 is experiencing a collision, the elevation device 70 may take actions, such that the protection cover 20 and the protruding element 30 may be lowered to the lower limit positions in the elevation channel 95. Correspondingly, the protection cover 20 fully enters into the elevation channel 95, such that the autonomous mobile device can escape the predicament. After the autonomous mobile device escapes the predicament, the elevation device 70 may move the protection cover 20 and the protruding element 30 back to the upper limit positions, such that the protruding element 30 can perform normal operations.

The elevation device 70 may be realized using multiple implementations. As one of the implementations, the elevation device 70 may be realized using a screw pair.

Figure 7:
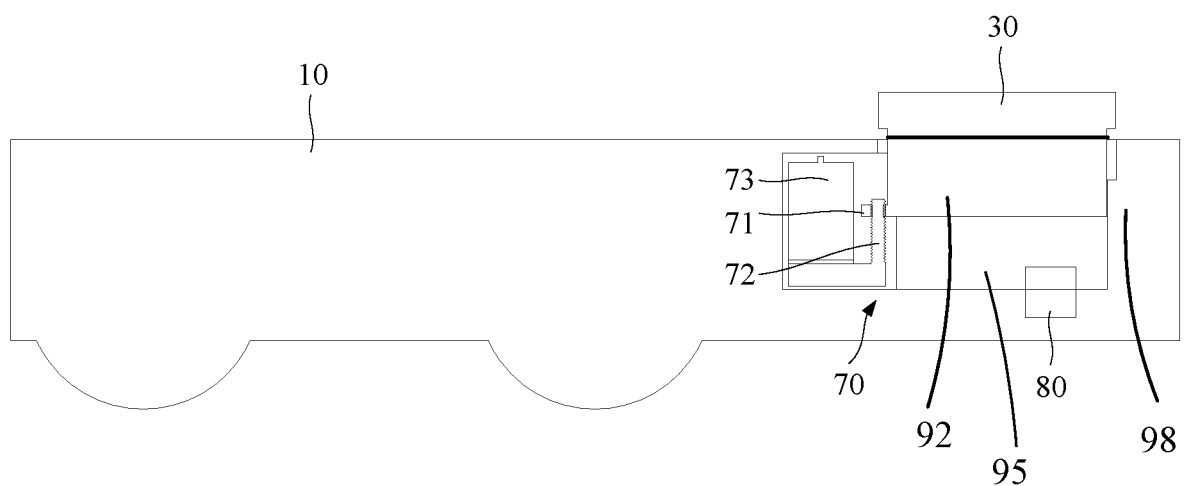
FIG. 7 is a schematic illustration of some structures of the autonomous mobile device, according to an embodiment of the present disclosure.
Figure 8:
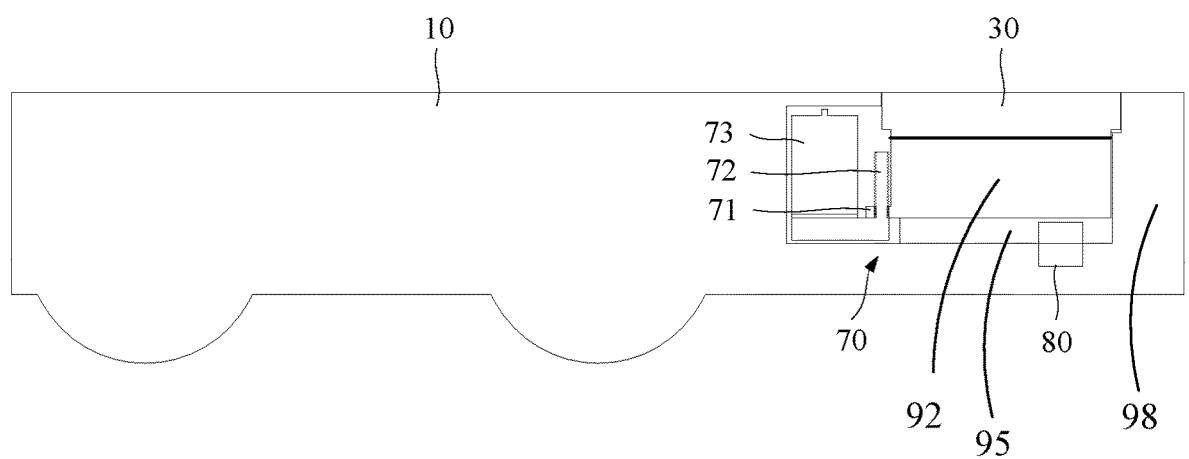
FIG. 8 is a schematic illustration of some structures of the autonomous mobile device, according to an embodiment of the present disclosure.
Figure 10:
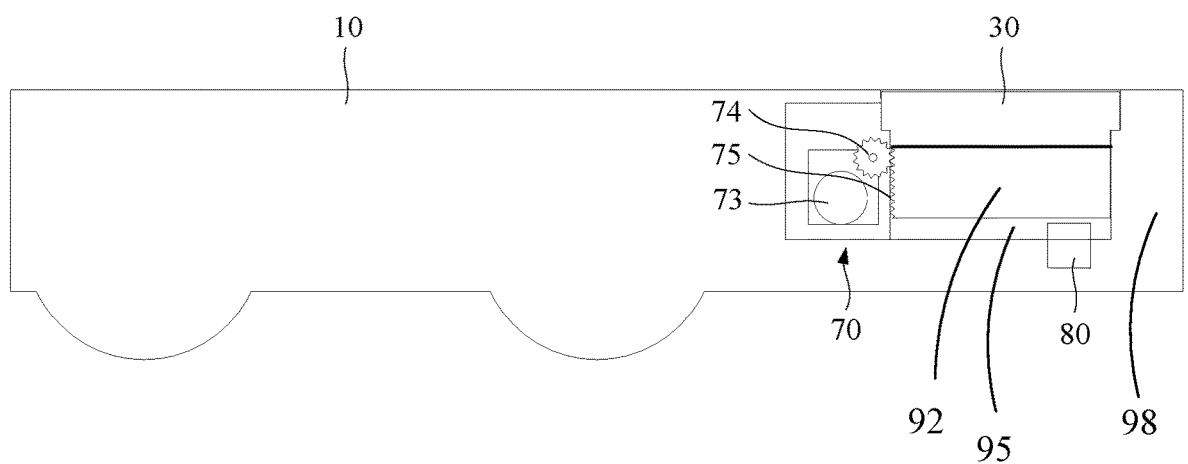
FIG. 10 is a schematic illustration of some structures of the autonomous mobile device, according to an embodiment of the present disclosure.

Illustratively, as shown in FIG. 7 and FIG. 8, the elevation device 70 may include a driving nut 71, a driving screw 72, and a rotation device 73. The driving nut 71, the driving screw 72, and the rotation device 73 are all disposed within the elevation channel 95. The driving screw 72 may extend in the depth direction of the elevation channel 95. The driving nut 71 may be fixed to a side wall of the fixing part 92. The driving screw 72 may be rotatably connected with the frame 98. The driving nut 71 and the driving screw 72 match with one another. The rotation device 73 and the driving screw 72 may be transmissively connected to cause the driving screw 72 to rotate, such that the driving nut 71 and the fixing part 92 move together in an extension direction of the driving screw 72, thereby enabling the protruding element 30 and the protection cover 20 to extend out of or retract back into the elevation channel 95. In some embodiments, as shown in FIG. 10, when the protruding element 30 and the protection cover 20 retract back into the elevation channel 95, the top surface of the protection cover 20 may be at the same level as a top surface of the main body 10. By realizing the ascending and descending of the fixing part 92 through the screw pair, the control may become more accurate.

The elevation device 70 may also include a guiding element. The guiding element may be the side wall of the elevation channel 95. For example, the inner profile of the side wall of the elevation channel 95 may match with the outer profile of the fixing part 92, such that the fixing part 92 may ascend and descend along the side wall of the elevation channel 95.

The rotation device 73 may include an electric motor, two belt pulleys, a belt (or a chain, a chain wheel), etc. For example, a shaft of the electric motor may be connected with a belt pulley, and another belt pulley may be fixed onto the external surface of the driving screw 72. The belt may wrap around the two belt pulley and extend tightly between the two belt pulleys. As such, when the electric motor drives one belt pulley, the one belt pulley may drive the other belt pulley to rotate. The driving screw 72 may rotate when driven by the belt pulleys, such that the fixing part 92 may ascend or descend when driven by the driving nut 71.

Figure 9:
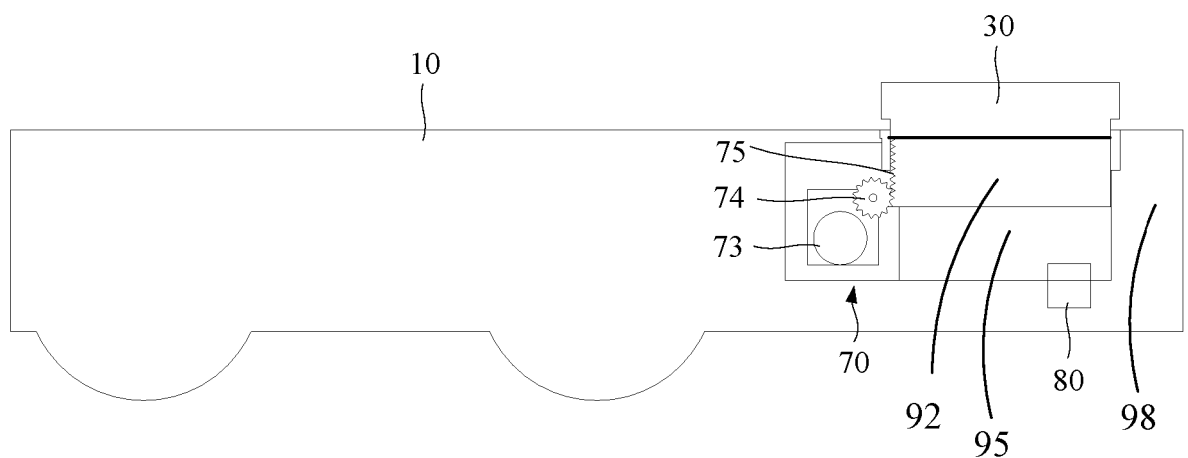
FIG. 9 is a schematic illustration of some structures of the autonomous mobile device, according to an embodiment of the present disclosure.

As shown in FIG. 9 and FIG. 10, as another implementation, the elevation device 70 may be realized through pinion and rack pair. Illustratively, the elevation device 70 may include a driving pinion 74, a rack 75, and the rotation device 73. The rack 75 may be connected with the fixing part 92, and may extend in the depth direction of the elevation channel 95. The driving pinion 74 may be engaged with the rack 75. The rotation device 73 and the driving pinion 74 may be transmissively connected to cause the driving pinion 74 to rotate.

The rack 75 may be fixed to the side wall of the fixing part 92. The rotation device 73 may include an electric motor and a deceleration box, etc. A main shaft of the electric motor and an input end of the deceleration box may be transmissively connected. The driving pinion 74 and the output end of the deceleration box may be transmissively connected, such that the deceleration box may adjust the rotation speed and torque of the driving pinion 74.

Finally, it is worth noting that: the above embodiments are only used to describe the technical solutions of the present disclosure, and are not intended to limit the scope of the present disclosure. Although the present disclosure has been described in detail with reference to the various embodiments, a person having ordinary skills in the art can appreciate: he/she can modify the technical solutions of the various embodiments, or can replace equivalent portions of some or all of the technical features. Such modification or replacement does not make the corresponding technical solutions fall out of the scope of the technical solutions of the embodiments of the present disclosure.

What is claimed is:

1. An autonomous mobile device, comprising:
   a main body;
   a protruding element disposed at a top portion of the main body;
   a protection cover disposed at an outer side of the protruding element to cover the protruding element, and is movable relative to the protruding element when collided;
   a joystick sensor including a housing, a joystick, and a parameter detecting device; and
   a position restoring device connected with the protection cover and configured to restore, after the protection cover experiences a displacement caused by an external force, the protection cover to a position where the protection cover is free from the external force,
   wherein a first end of the joystick is connected to an inner portion of the housing,
   wherein the joystick is pivotable around a connection point between the joystick and the housing,
   wherein a second end of the joystick is connected to the protection cover,
   wherein the protection cover is configured to cause the joystick to pivot, and
   wherein the parameter detecting device is disposed inside the housing and is configured to detect a pivot parameter of the joystick,
   wherein a position restricting pillar is disposed at the top portion of the main body,
   wherein the protection cover includes a cover body disposed at an outer periphery of the protruding element to cover the protruding element and a protruding flange disposed at a lower portion of the cover body,
   wherein an elongated cavity extending in a positive moving direction of the autonomous mobile device is disposed on the protruding flange,
   wherein the position restricting pillar is inserted into the elongated cavity, and
   wherein the position restoring device is connected with the position restricting pillar and an inner wall of the elongated cavity respectively.

2. The autonomous mobile device of claim 1,
   wherein the pivot parameter includes one or more of a pivot angle, a pivot velocity, or a pivot acceleration.

3. The autonomous mobile device of claim 1,
   wherein the joystick is configured to be movable along an axial direction of itself, and the parameter detecting device is configured to detect a travel distance of an axial direction movement of the joystick.

4. The autonomous mobile device of claim 1, wherein the joystick sensor is disposed between the protection cover and the main body.

5. The autonomous mobile device of claim 4,
   wherein when the protection cover is at an initial position, the second end of the joystick extends straightly upwardly and is connected with the protection cover.

6. The autonomous mobile device of claim 5,
   wherein a mounting groove is disposed at the top portion of the main body,
   wherein the joystick sensor is inserted into the mounting groove, and
   wherein a portion of the protection cover covers an opening of the mounting groove.

7. The autonomous mobile device of claim 4,
   wherein a connecting groove is disposed on the protection cover,
   wherein the second end of the joystick is inserted into the connecting groove, and
   wherein the second end of the joystick includes a surface of a partial sphere, and the surface of the partial sphere abuts against an inner wall of the connecting groove.

8. The autonomous mobile device of claim 1, further comprising an elevation device,
   wherein the main body includes a frame and a fixing part,
   wherein an elevation channel is provided at a top portion of the frame,
   wherein the fixing part is slidably disposed in the elevation channel,
   wherein the protruding element and the protection cover are both disposed on the fixing part,
   wherein the elevation device is connected with the frame and the fixing part, and
   wherein when the parameter detecting device detects a collision occurring to the protection cover, the elevation device is configured to drive the fixing part to retract into the elevation channel to thereby retract the protection cover and the protruding element into the elevation channel.

* * * * *